(12) United States Patent
Chen et al.

(10) Patent No.: US 7,670,011 B2
(45) Date of Patent: Mar. 2, 2010

(54) PROJECTOR ASSEMBLY PROVIDED WITH AN AUXILIARY DEVICE

(75) Inventors: Chin-Ping Chen, Miao Li County (TW); Po-Chuan Kang, Miao Li County (TW)

(73) Assignee: Coretronic Corporation, Chu-Nan, Miao Li County (TW)

( * ) Notice: Subject to any disclaimer, the term of this patent is extended or adjusted under 35 U.S.C. 154(b) by 812 days.

(21) Appl. No.: 11/433,457

(22) Filed: May 15, 2006

(65) Prior Publication Data

US 2006/0274289 A1    Dec. 7, 2006

(30) Foreign Application Priority Data

May 19, 2005    (TW)    .............. 94116284 A

(51) Int. Cl.
    *G03B 21/14*    (2006.01)
(52) U.S. Cl. ................................... 353/119
(58) Field of Classification Search ............ 353/29, 353/57, 94, 122, 119; 362/640; 349/5, 6, 349/8, 11
    See application file for complete search history.

(56) References Cited

U.S. PATENT DOCUMENTS

| | | | | |
|---|---|---|---|---|
| 4,953,971 | A | * | 9/1990 | Highfill ................... 353/122 |
| 5,632,546 | A | * | 5/1997 | Lee ........................ 353/122 |
| 5,662,402 | A | * | 9/1997 | Kim ........................ 353/119 |
| 5,696,529 | A | * | 12/1997 | Evanicky et al. ........... 345/659 |
| 5,855,488 | A | * | 1/1999 | Heintz et al. ............. 439/310 |
| 5,876,105 | A | * | 3/1999 | Rodriquez, Jr. ........... 353/119 |
| 5,993,012 | A | * | 11/1999 | Buchanan et al. .......... 353/119 |
| 6,042,234 | A | * | 3/2000 | Itoh ....................... 353/20 |
| 6,132,047 | A | * | 10/2000 | Itoh ....................... 353/20 |
| 6,144,360 | A | * | 11/2000 | Evanicky et al. .......... 345/102 |
| 6,341,867 | B1 | * | 1/2002 | Itoh ....................... 353/20 |
| 6,345,896 | B1 | | 2/2002 | Kurosawa |
| 6,558,003 | B2 | * | 5/2003 | Mihara ..................... 353/52 |
| 6,783,248 | B2 | * | 8/2004 | Miyata ..................... 353/85 |
| 7,014,320 | B2 | * | 3/2006 | Shiraishi .................. 353/57 |
| 7,144,120 | B2 | * | 12/2006 | Soper et al. ............... 353/94 |
| 7,188,958 | B2 | * | 3/2007 | Zoidis et al. ............. 353/119 |
| 7,195,373 | B2 | * | 3/2007 | Ishii et al. ............... 362/241 |
| 7,204,605 | B2 | * | 4/2007 | Kanayama et al. .......... 362/230 |
| 7,232,225 | B2 | * | 6/2007 | Shiraishi .................. 353/57 |
| 7,296,900 | B2 | * | 11/2007 | Fujimori ................. 353/119 |
| 2002/0048001 | A1 | * | 4/2002 | Fujimori ................. 353/119 |
| 2003/0223047 | A1 | * | 12/2003 | Fujimori .................. 353/31 |
| 2004/0036791 | A1 | * | 2/2004 | Voss et al. ............. 348/333.07 |
| 2004/0041989 | A1 | * | 3/2004 | Olson et al. ............. 353/122 |

(Continued)

*Primary Examiner*—William C Dowling
*Assistant Examiner*—Danell L Owens
(74) *Attorney, Agent, or Firm*—Birch, Stewart, Kolasch & Birch, LLP

(57) ABSTRACT

A projector assembly includes a projector casing and an auxiliary device. The projector casing is formed with a mating aperture, and has a first light source for emitting light beams defining an optical path of the projector assembly. The auxiliary device includes a mating part inserted detachably into the mating aperture in the projector casing, a second light source disposed in the mating part for emitting light beams, and a light-beam guiding module disposed in the mating part in front of the second light source so that the light beams emitted from the second light source are guided into the optical path via the light-beam guiding module, thereby enhancing illumination of the optical path of the projector assembly.

12 Claims, 7 Drawing Sheets

U.S. PATENT DOCUMENTS

| | | |
|---|---|---|
| 2004/0189956 A1* | 9/2004 | Kanayama et al. ............ 353/96 |
| 2004/0233397 A1* | 11/2004 | Takemi ........................ 353/97 |
| 2005/0117337 A1* | 6/2005 | Ishii et al. ................... 362/241 |
| 2005/0219480 A1* | 10/2005 | Yano ........................... 353/122 |
| 2005/0248734 A1* | 11/2005 | Chung et al. .................. 353/94 |
| 2006/0238724 A1* | 10/2006 | Trivedi ........................ 353/119 |

* cited by examiner

PROJECTOR ASSEMBLY PROVIDED WITH AN AUXILIARY DEVICE

FIELD OF THE INVENTION

The invention relates to a projector assembly, more particularly to a projector assembly provided that includes a projector casing and an auxiliary device detachably coupled to the projector casing in order to enhance the abilities of the projector assembly, such as enhancing a illumination of an optical path, heat dissipation from the projector casing and signal transmission.

BACKGROUND OF THE INVENTION

When holding a conference (business, education or entertainment) in an auditorium and in case of making a presentation, a projector assembly is generally preferred due to its bulky screen and its portability.

FIG. 1 is a top sectional view of a conventional projector assembly, and includes a projector casing 2, a light source 4 disposed in the projector casing 2 for emitting light beams defining an optical path in cooperation with several optical members 6 and a light filter 8, and a projection lens 10 disposed in the projector casing 2 for projecting an image onto a distal screen (not shown).

It is noted that the aforesaid components of the conventional projector assembly are mounted securely within the projector casing 2 at fixed positions in order to avoid the problems of being removed or ruined, thereby eliminating damage caused to the conventional projector assembly. However, the fixed position of the optical components limits or hinders the utility range (the places) of the conventional projector assembly. For instance, in case the conventional projector assembly is used in a place, where illumination is relatively poor (high or lower temperature), the light source 4 in the projector casing 2 is unable to provide the sufficient illumination to fit the ambient surrounding.

SUMMARY OF THE INVENTION

The object of the present invention is to provide a projector assembly including an auxiliary device to overcome the disadvantages encountered during use of the conventional projector assembly.

In one aspect of the present invention, a projector assembly is provided to include: a projector casing formed with a mating aperture, and having a first light source disposed within the projector casing for emitting light beams that cooperatively define an optical path of the projector assembly; and an auxiliary device including a mating part inserted detachably into the mating aperture in the projector casing, a second light source disposed in the mating part for emitting light beams, and a light-beam guiding module disposed in the mating part in front of the second light source so that the light beams emitted from the second light source are adapted to be guided into the optical path via the light-beam guiding module, thereby enhancing illumination of the optical path of the projector assembly.

In a second aspect of the present invention, a projector assembly is provided to include: a projector casing formed with a mating aperture; and an auxiliary device including a mating part inserted detachably into the mating aperture in the projector casing, and a fan unit for generating an air flow that flows into the projector casing via the mating part of the auxiliary device once the mating part is inserted detachably into the mating aperture of the projector casing.

In a third aspect of the present invention, a projector assembly is provided to include: a projector casing formed with a mating aperture, and having a first connector adjacent to the mating aperture; and an auxiliary device including a mating part inserted detachably into the mating aperture in the projector casing, a signal receiving end disposed externally of the mating part in order to receive externally inputted image signals, and a second connector disposed in the mating part in such a manner that the second connector is coupled electrically to the first connector once the mating part is inserted detachably into the mating aperture of the projector casing.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENT

Figure 1:
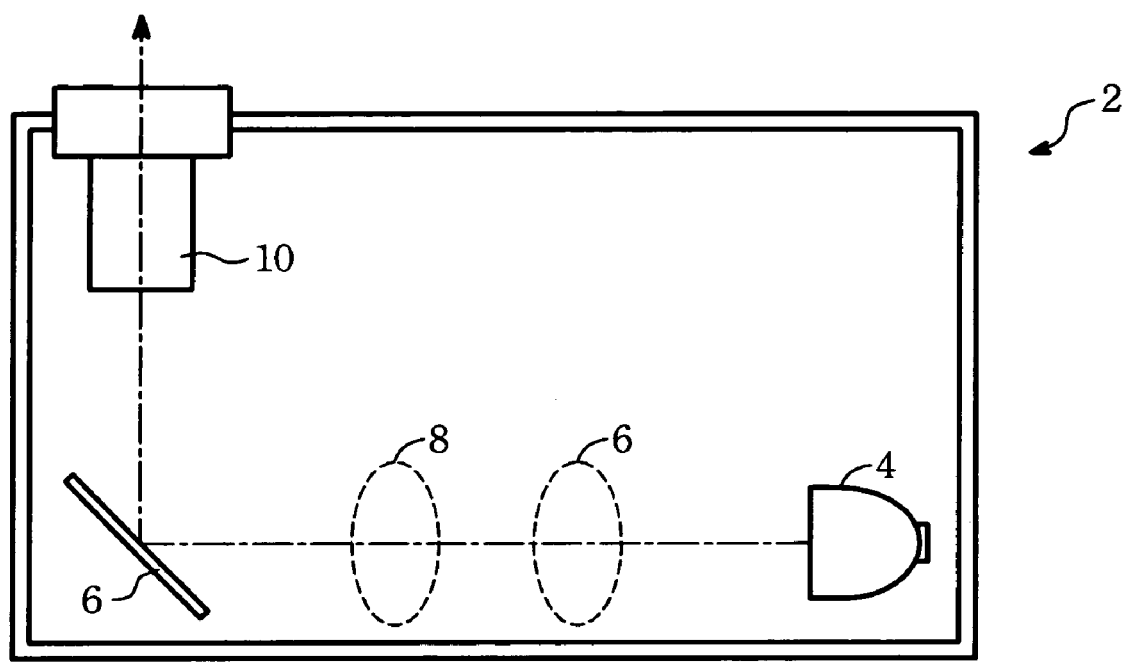
FIG. 1 is a top sectional view of a conventional projector assembly.
Figure 2:
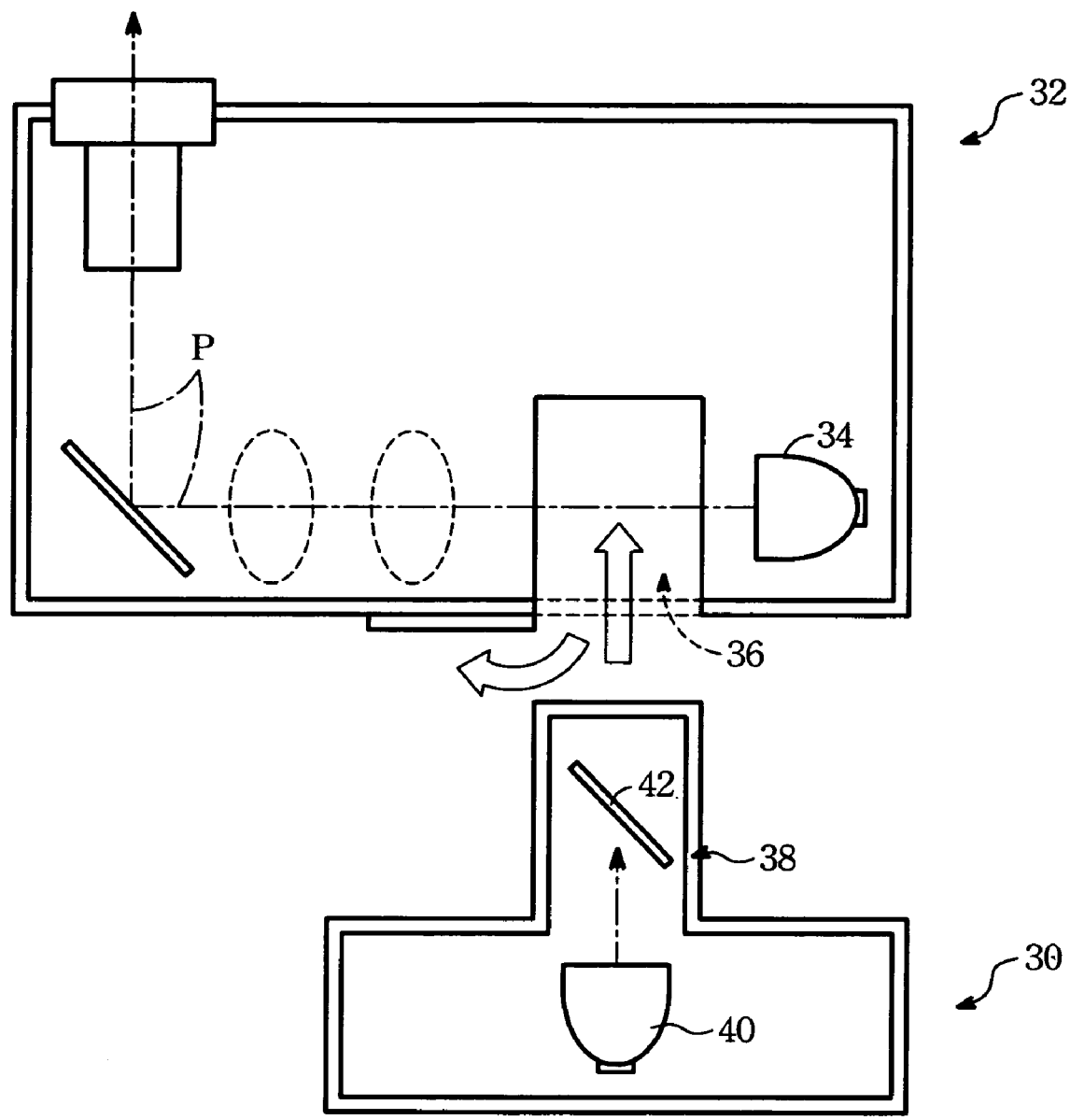
FIG. 2 is an exploded and schematic view of a projector assembly of the present invention.

FIG. 2 shows a top planar and exploded view of a projector assembly of the present invention, and includes a projector casing 32 and an auxiliary device 30.

As illustrated, the projector casing 32 is formed with a mating aperture 36, and has a first light source 34 disposed therein for emitting light beams that cooperatively define an optical path of the projector assembly. The projector casing 32 is formed with an inwardly indented recess defining the mating aperture 36. The first light source 34 is disposed within the projector casing 32 in such a manner that the optical path extends transversely through the mating aperture 36. A protective shield (not shown) is mounted detachably over the aperture 36 in the projector casing 32 so as to prevent dirt and waste from getting interior of the projector casing 32. A display screen is spaced apart from the projector casing 32 in order to display the image projected by a projection lens in the projector casing 32. As to how the projector lens projects the image onto the display screen is known in the art and not relevant to the feature of the present invention, a detailed description thereof is omitted herein for the sake of brevity.

The auxiliary device 30 includes a mating part 38 inserted detachably into the mating aperture 36 in the projector casing 32, a second light source 40 disposed in the mating part 38 for emitting light beams, and a light-beam guiding module 42 disposed in the mating part 38 in front of the second light source 40 so that the light beams emitted from the second light source 40 are guided into an optical path P via the light-beam guiding 42, thereby enhancing illumination of the optical path P of the projector assembly. The mating part 38 of the auxiliary device 30 is preferably made from light transparent material, such as glass, since the mating part 38 extends transversely with respect to the optical path P once inserted into the mating aperture 36 in the projector casing 32.

Figure 3:
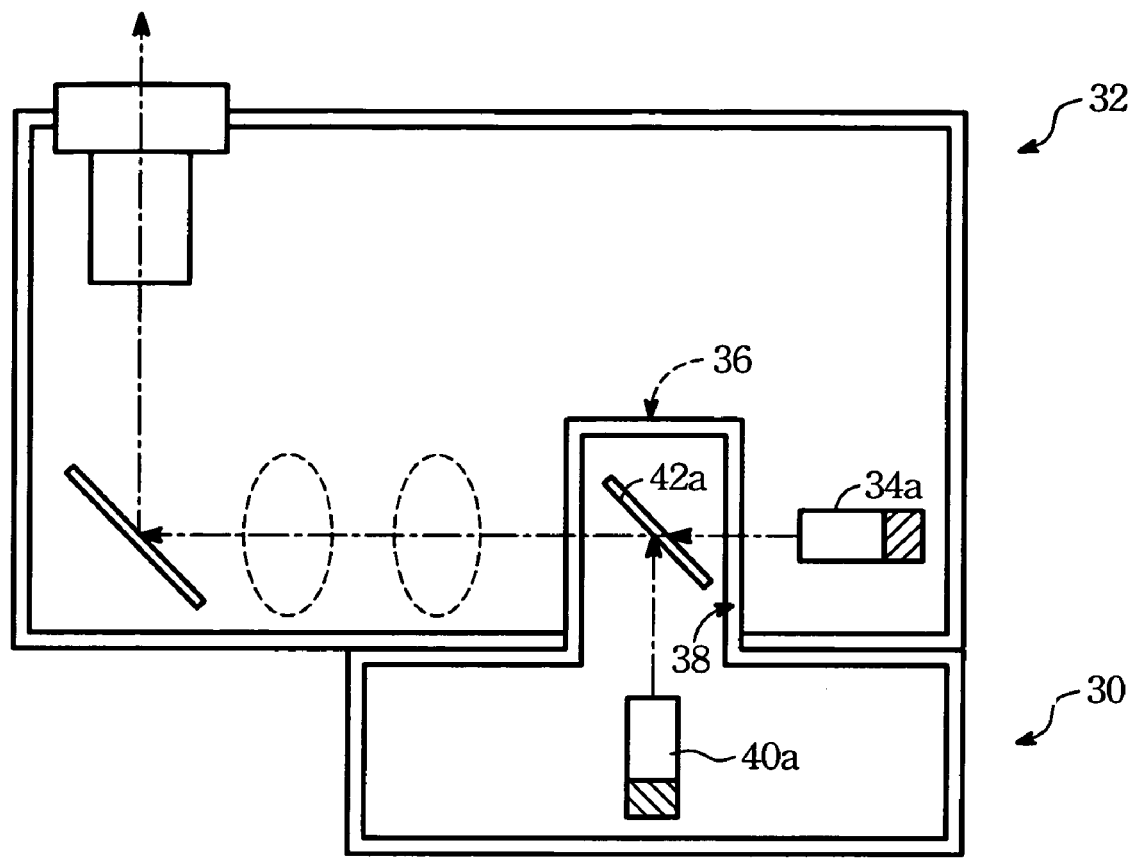
FIG. 3 illustrates a first embodiment of a first light source employed in the projector assembly of the present invention.

Referring to FIG. 3, in one embodiment, first and second light emitting diode (LED) units 34a, 40a respectively serve as the first and second light sources while the light-beam guiding module 42 can be a dichroic coating filter 42a that is capable of collecting the light beams emitted from the first and second LED units 34a, 40a into the optical path P of the projector assembly.

Figure 4:
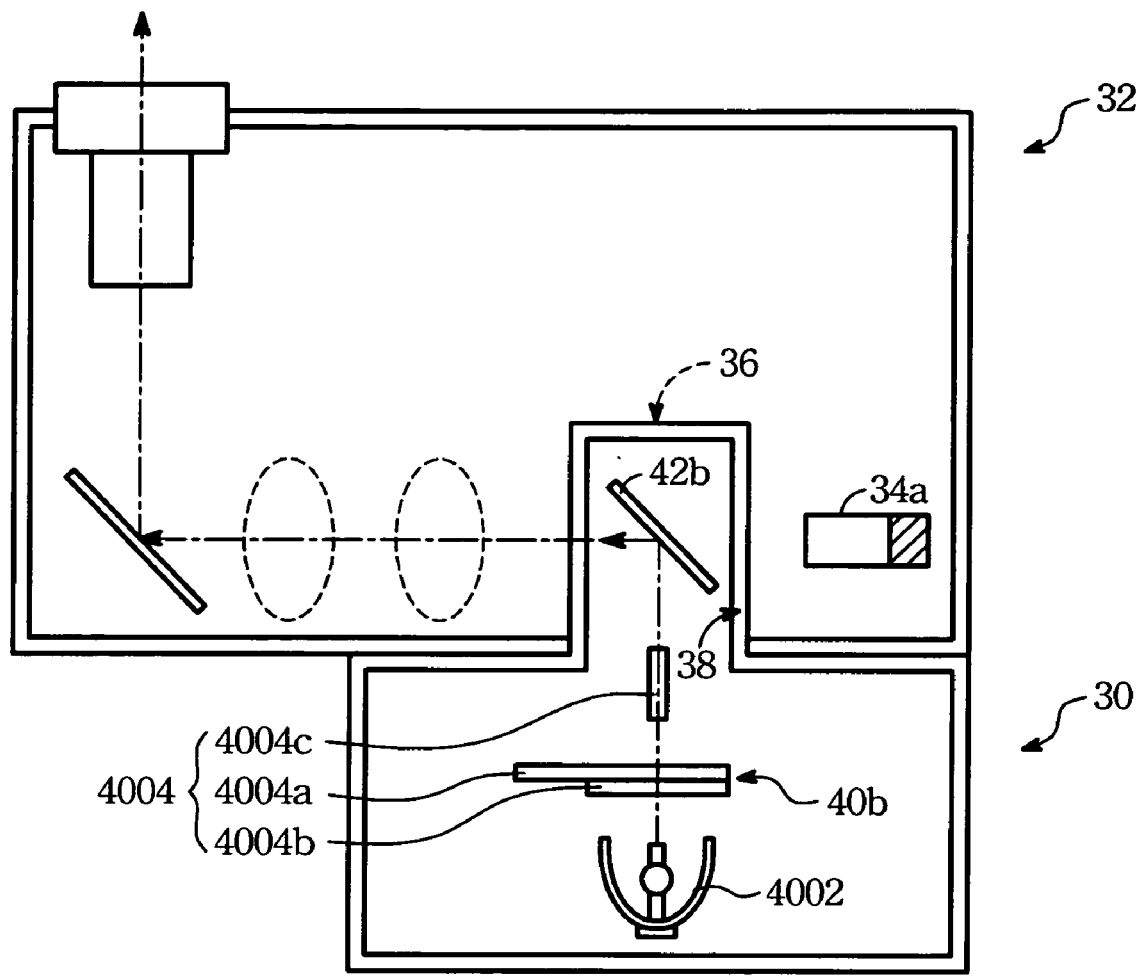
FIG. 4 illustrates a second embodiment of a first light source employed in the projector assembly of the present invention.

Referring to FIG. 4, in second embodiment, the auxiliary device 30 as in FIG. 3 but the second light source can be a high brightness lamp 40b. The light-beam guiding module 42 includes a reflection mirror 42b that is capable of reflecting said light beams emitted from the high brightness lamp 40b into the optical path, which is the optical path of the light beams emitted from the first light source 34a, in order to result in the enhanced illumination of the optical path of the projector assembly. The high brightness lamp 40b includes a bulb module 4002 and an optical member 4004. The bulb module 4002 is selected from a lamp group consisting of an ultra-high performance (UHP) lamp and a metal-halide lamp (MHL). The optical member 4004 includes a color wheel 4004a, a UV/IR filter 4004b and an integration rod 4004c.

Figure 5:
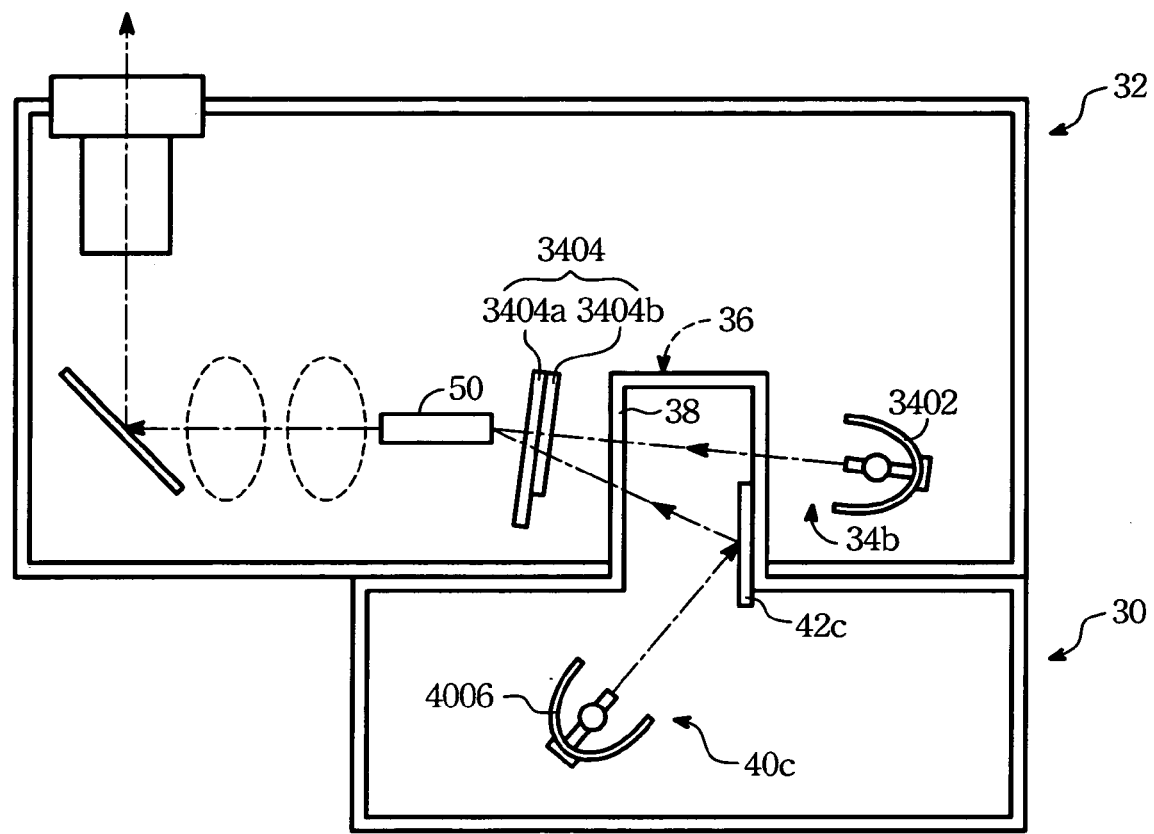
FIG. 5 illustrates a third embodiment of a first light source employed in the projector assembly of the present invention.

Referring to FIG. 5, in addition, the first light source can be another high brightness lamp 34b that includes a bulb module 3402 and an optical member 3404. The bulb module 3402 is selected from a lamp group consisting of a (UHP) lamp and a (MHL). The optical member 3404 includes a color wheel 3404a, a UV/IR filter 3404b. An integration rod 50 is disposed adjacent to the color wheel 3404a. The second light source 40 is also a high brightness lamp 40c that includes a bulb module 4006. The integration rod 50 is disposed in the optical path that is cooperatively defined by the bulb modules 3402, 4006. The reflection mirror 42c is capable of reflecting the light beams emitted from the high brightness lamp 40c into the optical path in order to result in the enhanced illumination of the optical path of the projector assembly.

Figure 6:
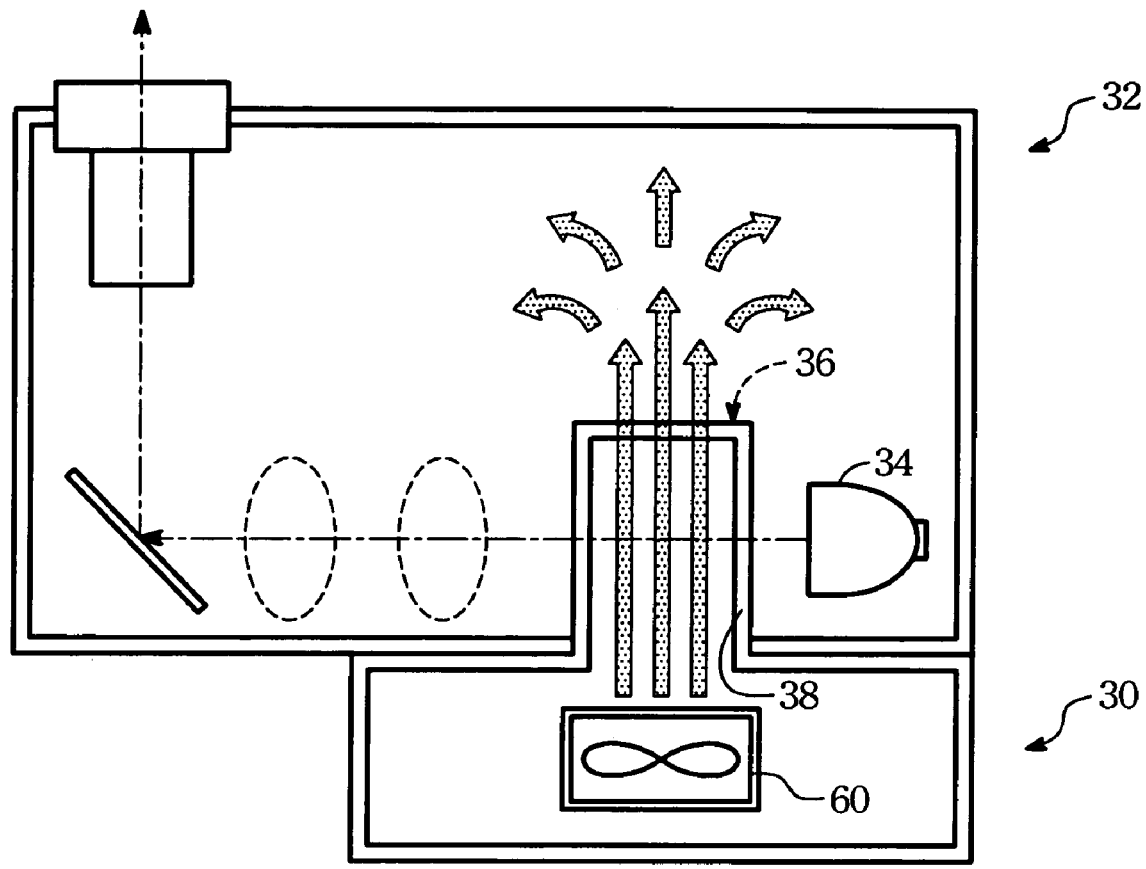
FIG. 6 illustrates how an auxiliary device employed in the projector assembly of the present invention dissipates heat from a projector casing.

Referring to FIG. 6, a modified embodiment of the auxiliary device 30 employed in the projector assembly of the present invention is shown, wherein a fan unit 60 is disposed in the auxiliary device 30 for generating an air flow that flows into the projector casing 32 via the mating part 38 of said auxiliary device 30 once the mating part 38 is inserted detachably into the mating aperture 36 of the projector casing 32. Under this condition, intensive heat generated due to operation of the projector assembly is dissipated outward from the projector casing 32 so as to lower ambient temperature.

Figure 7:
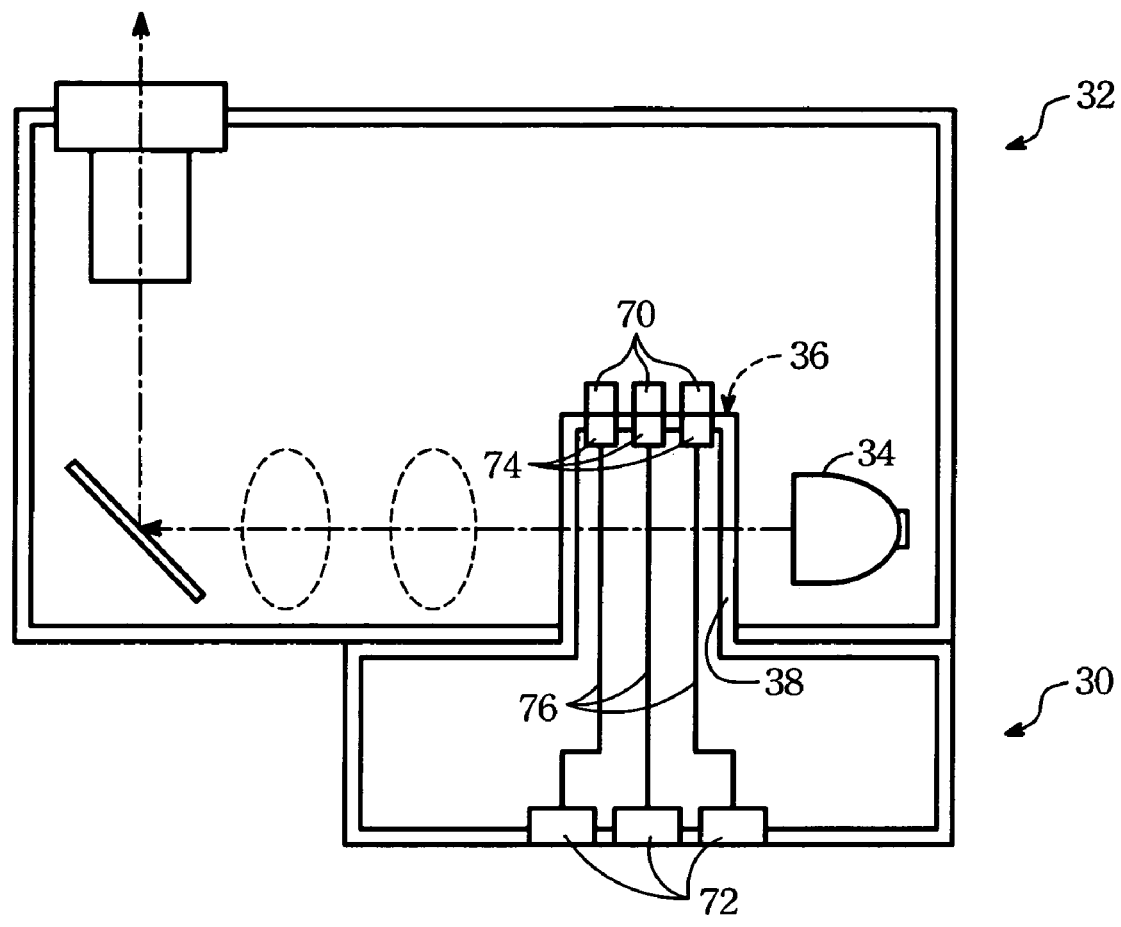
FIG. 7 illustrates how an auxiliary device employed in the projector assembly of the present invention enhances the transmission signals in the projector casing.

Referring to FIG. 7, another modified embodiment of the auxiliary device 30 employed in the projector assembly of the present invention is shown, wherein a first connector 70 is fixed within the projector casing 32 adjacent to the mating aperture 36. The auxiliary device 30 includes at least a signal receiving end 72 exposed externally thereof in order to receive input image signals, a second connector 74 disposed in the mating part 38, and a plurality of coupling wires 76 interconnecting the second connector 74 and the signal receiving end 72 in such a manner that the second connector 74 is connected electrically to the first connector 70 once the mating part 38 is inserted detachably into the mating aperture 36 of the projector casing 32. Under this condition, the data signals, such as Composite signals, S Video signals, analog RGB signal or DVI signals, received at the receiving end 72 are transmitted into the projector casing 32 via the coupling wires 76.

To summarize the above paragraphs, it is observable that since the auxiliary device 30 is mounted detachably on the projector casing for enhancing the abilities of the present projector assembly, the disadvantages encountered during use of the conventional projector assembly are overcome.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

The invention claimed is:

1. A projector assembly comprising:
   a projector casing formed with a mating aperture, and having a first light source disposed within said projector casing for emitting light beams that cooperatively define an optical path of the projector assembly; and
   an auxiliary device including
   a mating part inserted detachably into said mating aperture to be received in said projector casing so that the optical path of the projector assembly passes through said mating part,
   a second light source disposed in said auxiliary device for emitting light beams, and
   a light-beam guiding module disposed in said mating part in front of said second light source so that said light beams emitted from said second light source are adapted to be guided into said optical path via said light-beam guiding module, thereby enhancing illumination of said optical path of the projector assembly.

2. The projector assembly according to claim 1, wherein said first light source is a first light emitting diode (LED) unit.

3. The projector assembly according to claim 2, wherein said second light source is a second LED unit, said light-beam guiding module including a dichroic coating filter that is capable of collecting said light beams emitted from said first and second LED units into said optical path of the projector assembly.

4. The projector assembly according to claim 2, wherein said second light source is a second high brightness lamp, said light-beam guiding module including a reflection mirror that is capable of reflecting said light beams emitted from said second high brightness lamp into said optical path of the projector assembly.

5. The projector assembly according to claim 4, wherein said second high brightness lamp includes a second bulb module and a second optical member, said second bulb module being selected from a lamp group consisting of a UHP (Ultra-High Performance) lamp and a MHL (Metal Halide) lamp, said second optical member including a second color wheel.

6. The projector assembly according to claim 1, wherein said first light source is a first high brightness lamp.

7. The projector assembly according to claim 6, wherein said first high brightness lamp includes a first bulb module, a first optical member and a first integration rod, said first bulb module being selected from a lamp group consisting of an ultra-high performance (UHP) lamp and a metal halide lamp (MHL), said first optical member including a first color wheel.

8. The projector assembly according to claim 7, wherein said second light source is a second high brightness lamp, said light-beam guiding module including a reflection mirror that is capable of reflecting said light beams emitted from said second high brightness lamp to the first color wheel in said optical path.

9. The projector assembly according to claim 1, further comprising a fan unit disposed in said auxiliary device for generating an air flow that flows into said projector casing via said mating part of said auxiliary device once said mating part is inserted detachably into said mating aperture of said projector casing.

10. The projector assembly according to claim 1, wherein said projector casing further includes a first connector fixed therein adjacent to said mating aperture, said auxiliary device further including a signal receiving end disposed externally thereof in order to receive externally inputted image signals, and a second connector disposed in said mating part in such a manner that said second connector is coupled electrically to said first connector once said mating part is inserted detachably into said mating aperture of said projector casing.

11. A projector assembly comprising:

a projector casing formed with a mating aperture; and an auxiliary device including a mating part inserted detachably into said mating aperture in said projector casing, and a fan unit for generating an airflow that flows into said projector casing via said mating part of said auxiliary device once said mating part is inserted detachably into said mating aperture of said projector casing.

12. A projector assembly comprising:

a projector casing formed with a mating aperture, and having a first connector adjacent to said mating aperture; and an auxiliary device including a mating part inserted detachably into said mating aperture in said projector casing, a signal receiving end disposed externally of said mating part in order to receive externally inputted image signals, and a second connector disposed in said mating part in such a manner that said second connector is coupled electrically to said first connector once said mating part is inserted detachably into said mating aperture of said projector casing.

* * * * *

UNITED STATES PATENT AND TRADEMARK OFFICE
CERTIFICATE OF CORRECTION

PATENT NO. : 7,670,011 B2
APPLICATION NO. : 11/433457
DATED : March 2, 2010
INVENTOR(S) : Chiu-Ping Chen It is certified that error appears in the above-identified patent and that said Letters Patent is hereby corrected as shown below:

Title Page should read
--(75) Inventors:   Chiu-Ping Chen, Miao Li County (TW);
Po-Chuan Kang, Miao Li County (TW).--

Signed and Sealed this

Twenty-fourth Day of August, 2010

David J. Kappos
*Director of the United States Patent and Trademark Office*